United States Patent
Lee et al.

(10) Patent No.: US 11,648,819 B2
(45) Date of Patent: May 16, 2023

(54) HEATING SYSTEM OF VEHICLE

(71) Applicants: Hyundai Motor Company, Seoul (KR); Kia Corporation, Seoul (KR)

(72) Inventors: Sang Shin Lee, Gyeonggi-do (KR); Man Ju Oh, Gyeonggi-do (KR); So Yoon Park, Gyeonggi-do (KR); Jae Woong Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/523,257

(22) Filed: Nov. 10, 2021

(65) Prior Publication Data
US 2022/0063375 A1 Mar. 3, 2022

Related U.S. Application Data

(62) Division of application No. 16/131,523, filed on Sep. 14, 2018, now Pat. No. 11,207,946.

(30) Foreign Application Priority Data

Apr. 9, 2018 (KR) .................. 10-2018-0040856

(51) Int. Cl.
*B60H 1/14* (2006.01)
*B60H 1/00* (2006.01)

(52) U.S. Cl.
CPC ......... *B60H 1/143* (2013.01); *B60H 1/00278* (2013.01); *B60H 1/00392* (2013.01); *B60H 1/00885* (2013.01); *B60H 2001/00928* (2013.01)

(58) Field of Classification Search
CPC ............ B60H 1/00278; B60H 1/143; B60H 2001/00307; B60H 2001/00928; H01M 10/613; H01M 10/615; H01M 10/663
See application file for complete search history.

(56) References Cited

U.S. PATENT DOCUMENTS

2014/0103128 A1 4/2014 Patel et al.
2016/0322678 A1 11/2016 Park

FOREIGN PATENT DOCUMENTS

| DE | 102013113229 A1 | 6/2015 |
| DE | 102016006682 A1 | 11/2017 |
| JP | 2002352867 A | 12/2002 |
| KR | 10-1448656 B1 | 10/2014 |
| KR | 10-2018-0112160 A | 10/2018 |

*Primary Examiner* — Eric S Ruppert
(74) *Attorney, Agent, or Firm* — Fox Rothschild LLP

(57) ABSTRACT

An indoor heating line is arranged to pass through a heater core for a coolant heater and indoor air conditioning, and is provided with a first pump so that coolant can flow. A battery heating line is branched from a downstream point of the heater core and connected to an upstream point of the coolant heater after passing through a battery heat exchange part for temperature-raising a high voltage battery, where the battery heating line includes a first heat exchange flow passage that connects a downstream point of the heater core to a first side of the battery heat exchange part, and a second heat exchange flow passage that connects a second side thereof and an upstream point of the coolant heater, where the first heat exchange flow passage and the second heat exchange flow passage are configured to mutually exchange heat.

4 Claims, 12 Drawing Sheets

HEATING SYSTEM OF VEHICLE

CROSS REFERENCE TO RELATED APPLICATION

The present application is a Divisional to U.S. Application No. 16/131,523 filed on Sep. 14, 2018, which claims under 35 U.S.C. § 119(a) the benefit of Korean Patent Application No. 10-2018-0040856 filed on Apr. 9, 2018, the entire contents of which are incorporated by reference herein.

BACKGROUND

(a) Technical Field

The present disclosure relates to a heating system of a vehicle, more particularly, to the heating system capable of efficiently managing energy required for indoor air conditioning and heating/cooling of a battery to prevent damage to the battery and reduce the load on a heater.

(b) Description of the Related Art

In recent years, electric vehicles have been developed to solve problems such as the implementation of environmentally friendly technologies and energy depletion. An electric vehicle utilizes a motor that receives electrical power from a battery and outputs power. Therefore, the electric vehicle has been very popular as an environmentally-friendly vehicle because it does not emit carbon dioxide, produces minimal noise, and has a highly energy efficient motor thereof as compared to a conventional engine.

A battery module is important technology to the electric vehicle, and recently, research to provide a lightweight battery that is downsized and has other beneficial characteristics such as a short charge time, etc. has been actively carried out. The battery module should be used in optimal temperature conditions in order to maintain optimum performance and long life. However, it is difficult to use the battery module in optimal temperature conditions due to heat generated during driving and external temperature change.

Further, since the electric vehicle does not have a waste heat source generated or combusted in a separate engine like an internal combustion engine, the electric vehicle performs indoor heating thereof in winter by an electric heater. In addition, since the electric vehicle requires warm-up in order to improve battery charging and discharging performance during cold weather, the electric vehicle uses an electric heater of a separate coolant heating type. That is, in order to maintain an optimum temperature environment of the battery module, the electric vehicle has adopted the technology of separately operating a cooling and heating system for controlling the battery module temperature other than a cooling and heating system for indoor air conditioning of the electric vehicle. In other words, the electric vehicle has incorporated two independent cooling and heating systems and used one for indoor cooling and heating and the other for battery module temperature control.

However, when operating in the manner described above, energy cannot be efficiently managed, so that it is not possible to travel long distances because of possible short driving distance. The driving range of the electric vehicle may be reduced over 30% in summer cooling and over 40% in winter heating, so that the winter heating problem, which is not a problem in the internal combustion engine, becomes even more serious. When a high-capacity Positive Temperature Coefficient (PTC) heater is installed to solve the problem of heating in winter, the travel distance is shortened, and the cost and weight due to the use of a heat pump becomes excessive.

Accordingly, the cooling and heating system for indoor air conditioning and the battery cooling and heating system are provided to share a coolant with each other, and thus technologies for improving the heating and battery temperature-raising efficiency have been attracting attention. However, since the main operating temperature (80° C. or more) of the heater and the temperature-raising temperature (50° C.) of the battery are different from each other, there is a problem that a high temperature coolant flows into the battery, causing damage to the battery, if the sophisticated cooperative control of the heating logic and battery temperature-raising logic is not performed.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a heating system of a vehicle which efficiently manages the energy required for indoor air conditioning and battery cooling and heating, thereby preventing damage to the battery, and reducing the load of a heater.

The heating system of the vehicle according to the present disclosure in order to achieve the above object may include an indoor heating line arranged to pass through a coolant heater and a heater core for indoor air conditioning and provided with a first pump so that coolant flows therein; and a battery heating line branched from a downstream point of the heater core and connected to an upstream point of the coolant heater after passing through a battery heat exchange part for temperature-raising a high voltage battery; wherein the battery heating line further includes: a first heat exchange flow passage that connects a downstream point of the heater core to a first side of the battery heat exchange part; and a second heat exchange flow passage that connects a second side of the battery heat exchange part and an upstream point of the coolant heater; wherein the first heat exchange flow passage and the second heat exchange flow passage is configured to mutually exchange heat.

The indoor heating line may include a first bypass flow passage connecting the point where the first heat exchange flow passage is connected and the point where the second heat exchange flow passage is connected with each other without going through the battery heat exchange part; and a first valve provided at the first bypass flow passage or the battery heating line for controlling the coolant flow.

The first valve may be installed at a branch point where the first heat exchange flow passage and one end portion of the first bypass flow passage branch off or the second heat exchange flow passage and another end portion of the first bypass flow passage branch off.

The first valve may be installed at the first heat exchange flow passage or the second heat exchange flow passage.

A battery cooling line may be provided to connect the first side and the second side of the battery heat exchange part and equipped with a second pump so that the coolant can be circulated; and wherein the first valve may be installed at a branch point where the first heat exchange flow passage and the battery cooling line branch off or the second heat exchange flow passage and the battery cooling line branch off.

A controller for controlling the opening of the first valve may be further included; and in the case of indoor and battery heating mode, the controller controls the first valve so that the coolant can circulate through the indoor heating line, the first heat exchange flow passage, the battery heat exchange part and the second heat exchange flow passage.

A controller for controlling the opening of the first valve may be further included; and in the case of indoor heating mode, the controller controls the first valve so that the coolant can circulate through the indoor heating line and the first bypass flow passage.

Some sections in the first heat exchange flow passage and the second heat exchange flow passage may be thermally connected to each other to form a heat exchange section for heat exchange; and a second bypass flow passage which connects the heat exchange section of the first heat exchange flow passage and the heat exchange section of the second heat exchange flow passage to each other without passing through the battery heat exchange part, and a second valve installed on the second bypass flow passage to adjust the coolant flow, may be further included.

A controller for controlling the opening of the second valve may be further included; and in the case of indoor and battery heating mode, the controller controls the second valve so that the coolant can circulate through the indoor heating line, the first heat exchange flow passage, the battery heat exchange part and the second heat exchange flow passage.

A controller for controlling the opening of the second valve may be further included; and in the case of indoor heating mode, the controller controls the second valve so that the coolant can circulate through the indoor heating line, the first heat exchange flow passage, the second bypass flow passage and the second heat exchange flow passage.

Some sections in the first heat exchange flow passage and the second heat exchange flow passage may be thermally connected to each other to form a heat exchange section for heat exchange; and a third bypass flow passage in parallel connected with the first heat exchange flow passage or the second heat exchange flow passage may be provided on the first heat exchange flow passage or the second heat exchange flow passage in order to bypass the heat exchange section.

A third valve for adjusting the coolant flow may be provided at the third bypass flow passage or the heat exchange flow passage in which the third bypass flow passage is installed.

The third valve may be operated so that the coolant can flow through the heat exchange flow passage when the coolant temperature is equal to or lower than the set temperature and the coolant can flow through the third bypass flow passage when the coolant temperature is higher than the set temperature.

The first valve may be a 4-way valve that is installed a branch point where the first heat exchange flow passage and end portions of the third bypass flow passage and the first bypass flow passage branch off in order to adjust the coolant flow.

A controller for controlling the opening of the first valve may be further included; and in the case of indoor and battery heating mode and when the coolant temperature is higher than a set temperature, the controller controls the first valve so that the coolant can circulate through the indoor heating line, the first heat exchange flow passage, the battery heat exchange part and the second heat exchange flow passage.

A controller for controlling the opening of the first valve may be further included; and in the case of indoor and battery heating mode and when the coolant temperature is equal to or lower than a set temperature, the controller controls the first valve so that the coolant can circulate through the indoor heating line, the third bypass flow passage, the battery heat exchange part and the second heat exchange flow passage.

A controller for controlling the opening of the first valve may be further included; and in the case of indoor heating mode, the controller controls the first valve so that the coolant can circulate through the indoor heating line and the first bypass flow passage.

According to the heating system of the vehicle configured to the above described structure, the coolant of the indoor heating line temperature-raised by the heater is arranged in order to pass through the battery, thereby quickly temperature-raising the battery.

Particularly, by exchanging heat between the coolant flowing into the battery and the coolant being discharged from the battery through the heat exchanger so that it is able to prevent the excessive temperature coolant from flowing into the battery to prevent damage to the battery and the medium temperature coolant can be supplied to the heater to reduce the operating load of the coolant heater.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
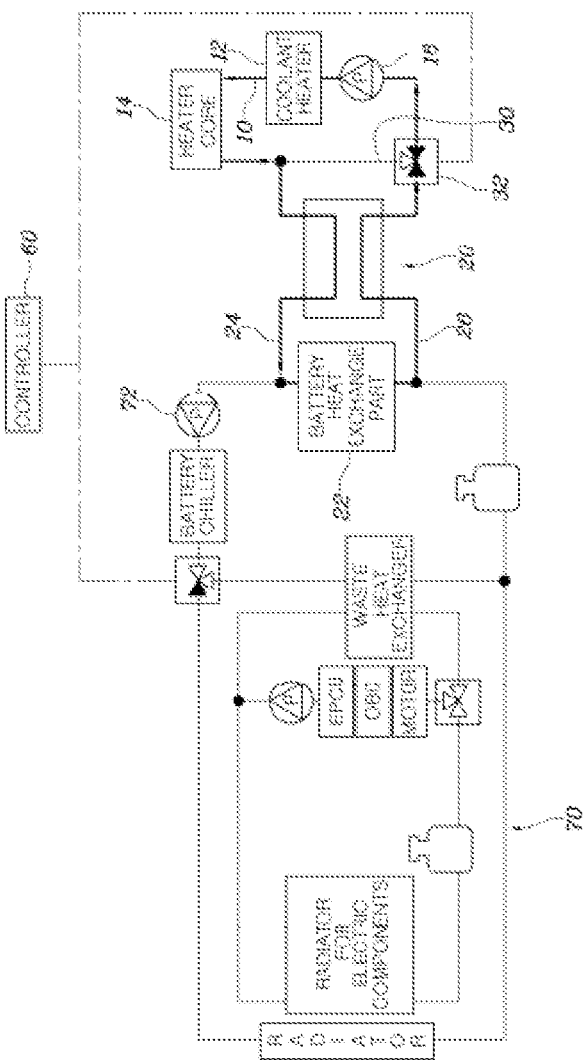
FIGS. 1 to 2 are drawings showing the operation of a heating system of a vehicle according to a first exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings. Like reference numerals denote like members throughout the drawings.

Figure 2:
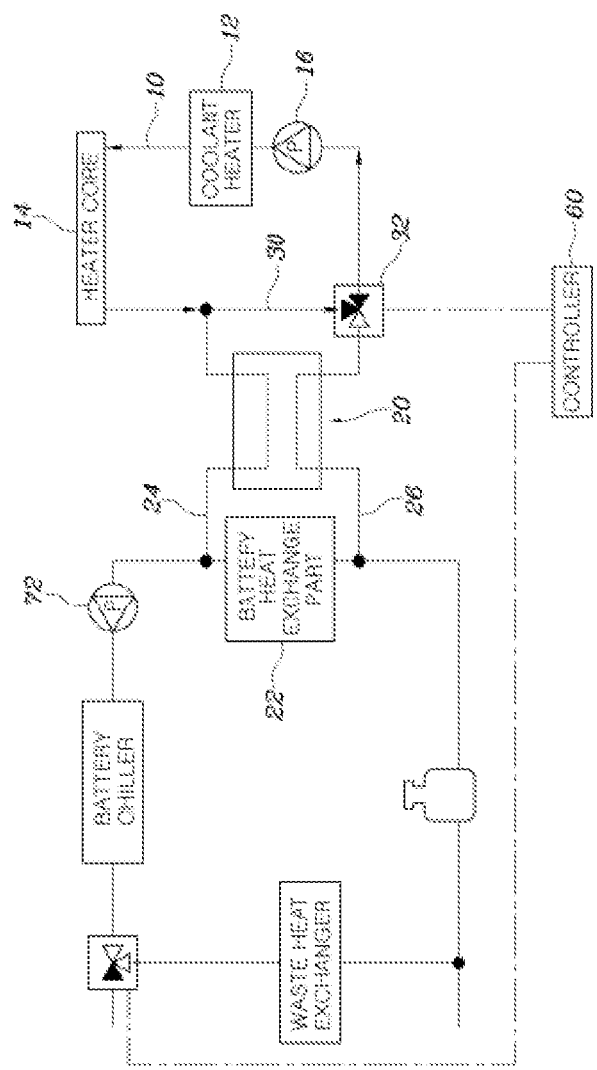

FIGS. 1 to 2 are drawings showing the operation of a heating system of a vehicle according to a first exemplary embodiment of the present disclosure; and FIGS. 3 to 7 are drawings variously showing application positions of a first valve of a heating system of a vehicle according to the first exemplary embodiment of the present disclosure. Referring to FIGS. 1 to 2, the heating system of the vehicle according the first exemplary embodiment of the present disclosure may include an indoor heating line 10 arranged to pass through a coolant heater 12 and a heater core 14 for indoor air conditioning and provided with a first pump 16 so that coolant flows therein; and a battery heating line 20 branched from a downstream point of the heater core 14 and connected to an upstream point of the coolant heater 12 after passing through a battery heat exchange part 22 for increasing the temperature of a high voltage battery. The battery heating line 20 may include a first heat exchange flow passage 24 that connects the downstream point of the heater core 14 to a first side of the battery heat exchange part 22 and a second heat exchange flow passage 26 that connects a second side of the battery heat exchange part 22 and the upstream point of the coolant heater 12, and the first heat exchange flow passage 24 and the second heat exchange flow passage 26 may be configured to mutually exchange heat.

Since an electric vehicle cannot perform indoor heating by using engine waste heat, a separate temperature-raising device is required.

The indoor heating line 10 of the present disclosure may be configured to pass through the coolant heater 12 and the heater core 14 for indoor air conditioning, so that the coolant is temperature-raised while passing through the coolant heater 12, and the temperature-raised coolant is supplied to the heater core 14, thereby supplying the heated air to the vehicle interior.

Further, an electric vehicle requires a system for temperature-raising or cooling a high voltage battery because it can only achieve optimal efficiency by maintaining the high voltage battery at an appropriate temperature.

Particularly, the battery heating line 20 that temperature-raises the high voltage battery by receiving and delivering a high temperature coolant discharged from the heater core 14 to the battery heat exchange part 22, may be arranged according to the present disclosure.

That is, because the indoor heating line 10 and the battery heating line 20 are connected to each other, the coolant heated by the coolant heater 12 flows through the heater core 14 and the battery heat exchange part 22 to achieve heating and battery temperature-raising, thereby simply implementing a heating and battery temperature-raising system.

However, if the coolant discharged from the heater core 14 is excessively high, it may be necessary to properly cool the coolant to be supplied to the battery heat exchange part 22 since the high voltage battery may fail when the coolant flows into the high voltage battery.

In the present disclosure, the first heat exchange flow passage 24 that connects the downstream point of the heater core 14 to the first side of the battery heat exchange part 22 and the second heat exchange flow passage 26 that connects the second side of the battery heat exchange part 22 to the upstream point of the coolant heater 12 are arranged so as to configure the battery heating line 20, and the first heat exchange flow passage 24 and the second heat exchange flow passage 26 are configured to mutually exchange heat.

Therefore, the coolant cooled while passing through the battery heat exchange part 22 cools the coolant passing through the downstream point of the heater core 14 to prevent the high temperature coolant from being delivered to the high voltage battery, thereby preventing battery damage.

Herein, the first heat exchange flow passage 24 and the second heat exchange flow passage 26 may be arranged to exchange heat with each other via a separate heat exchanger, and/or are simply adjacently installed to exchange heat with each other. This can vary depending on the particular design or vehicle.

In particular, the indoor heating line 10 in the heating system of the vehicle according to the present disclosure may include a first bypass flow passage 30 connecting the point where the first heat exchange flow passage 24 is connected with the point where the second heat exchange flow passage 26 is connected without going through the battery heat exchange part 22; and a first valve 32 provided at the first bypass flow passage 30 or the battery heating line 20 for controlling the coolant flow.

In a situation where the indoor heating line 10 and the battery heating line 20 share coolant with each other as in the present disclosure, it is necessary to stop the temperature-raising of the high voltage battery when the temperature-raising of the high voltage battery becomes excessive.

At this time, it is unnecessary to supply the coolant through the heater core 14 to the battery heat exchange part 22, which can cause damage to the high voltage battery.

Therefore, the present disclosure provides the first bypass flow passage 30 and the first valve 32 to prevent damage to the high voltage battery.

That is, the first bypass flow passage 30 is arranged to connect the point where the first heat exchange flow passage 24 is connected and the point where the second heat exchange flow passage 26 is connected at the indoor heating line 10, and arranged to selectively received the coolant through the heater core 14 by the first valve 32 so that the coolant can only flow through the indoor heating line 10 for heating. A detailed description is provided herein.

In a first embodiment of the heating system of the vehicle, the first valve 32 may be arranged at various locations.

That is, the first valve 32 may be installed at a branch point where the first heat exchange flow passage 24 and one end portion of the first bypass flow passage 30 branch off or the second heat exchange flow passage 26 and another end portion of the first bypass flow passage 30 branch off.

Figure 3:
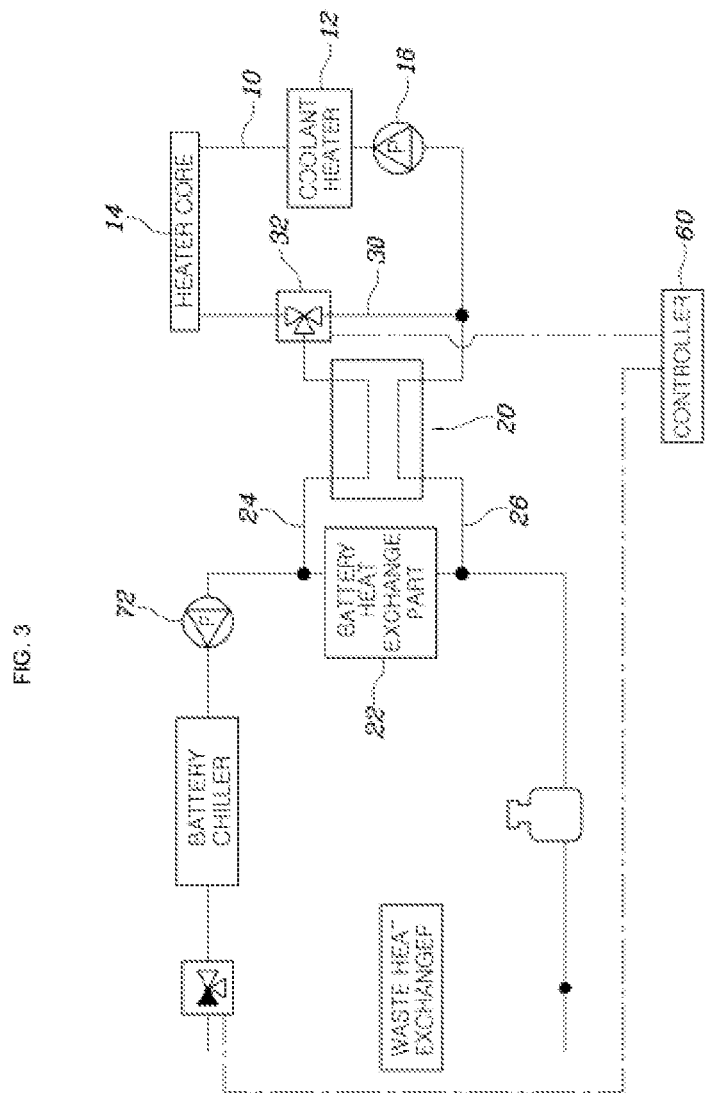
FIGS. 3 to 7 are drawings variously showing application positions of the first valve of the heating system of the vehicle according to the first exemplary embodiment of the present disclosure.

FIGS. 1 to 2 show, respectively, that the first valve 32 is installed at a branch point where the second heat exchange flow passage 26 and the other end of the first bypass flow passage 30 are branched. On the other hand, FIG. 3 shows that the first valve 32 is installed at a branch point where the first heat exchange flow passage 24 and one end of the first bypass flow passage 30 are branched.

Herein, the first valve 32 may be a 3-way valve so that the coolant pumped from the first pump 16 can be selectively supplied to the battery heat exchange part 22.

Figure 4:
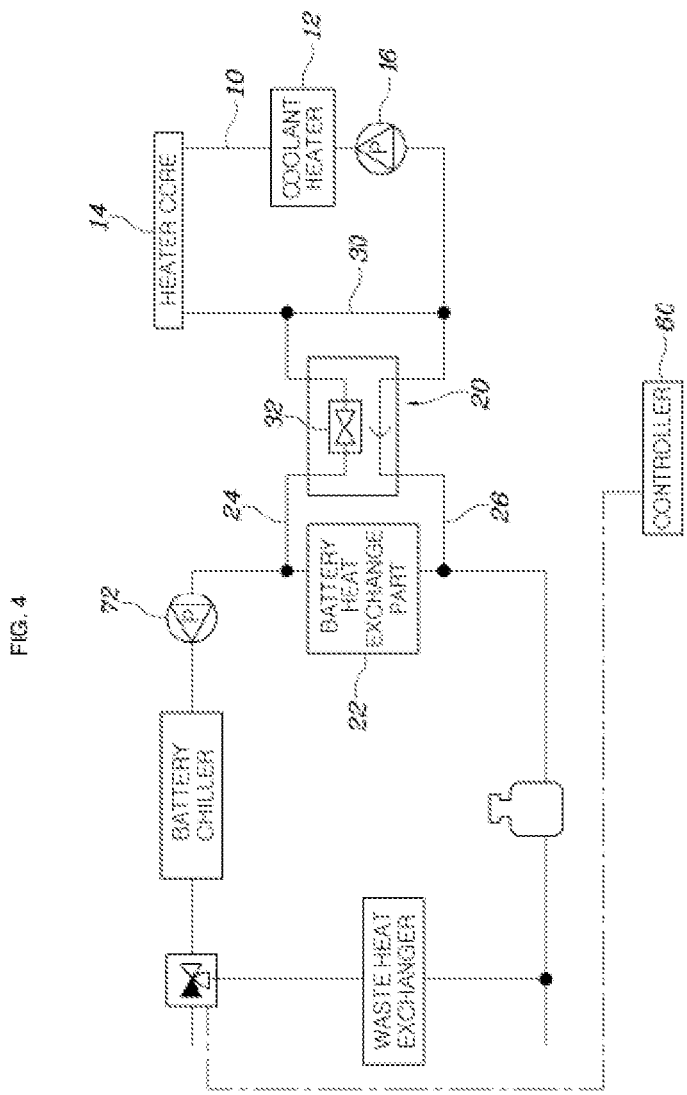
Figure 5:
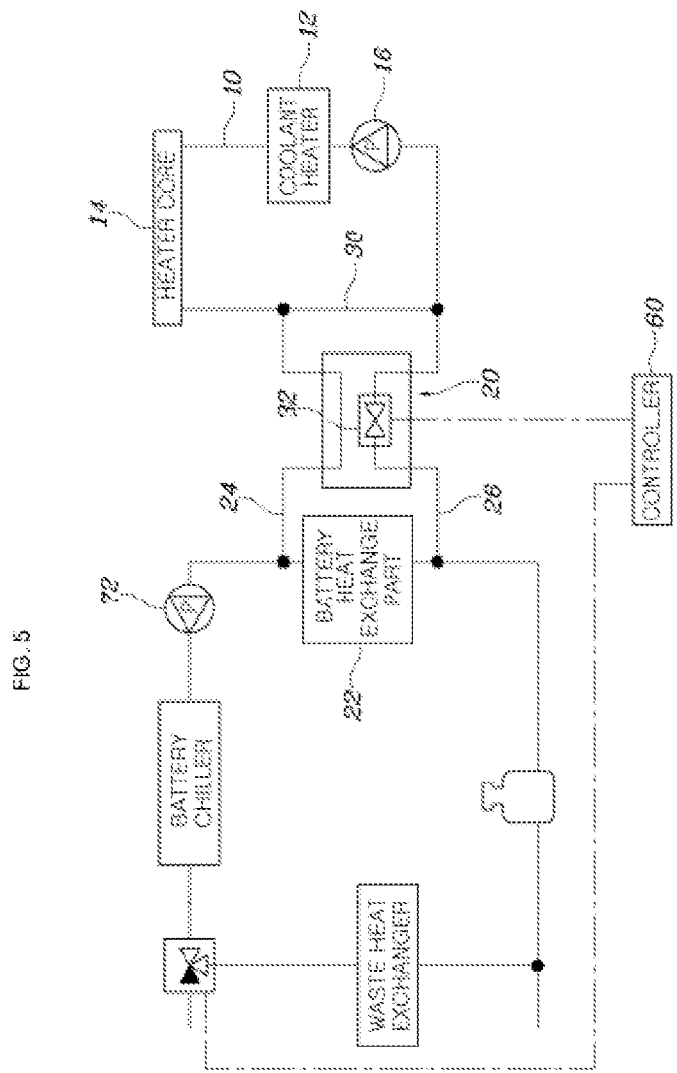

Further, referring to FIGS. 4 and 5, the first valve 32 may be installed on the first heat exchange flow passage 24 or the second heat exchange flow passage 26.

That is, as shown in FIG. 4, the first valve 32 is installed on the first heat exchange flow passage 24 or, as shown in FIG. 5, on the second heat exchange flow passage 26.

Therefore, the first valve 32 is arranged so that the high temperature coolant discharged from the heater core 14 can be selectively transmitted to the battery heat exchange part 22. In particular, the first valve 32 may be a 2-way open and close valve. Similarly, if the first valve 32 is arranged as an open and close valve that is turned on and off, the disclosure can be produced at a lower cost than when applying a 3-way valve.

Figure 6:
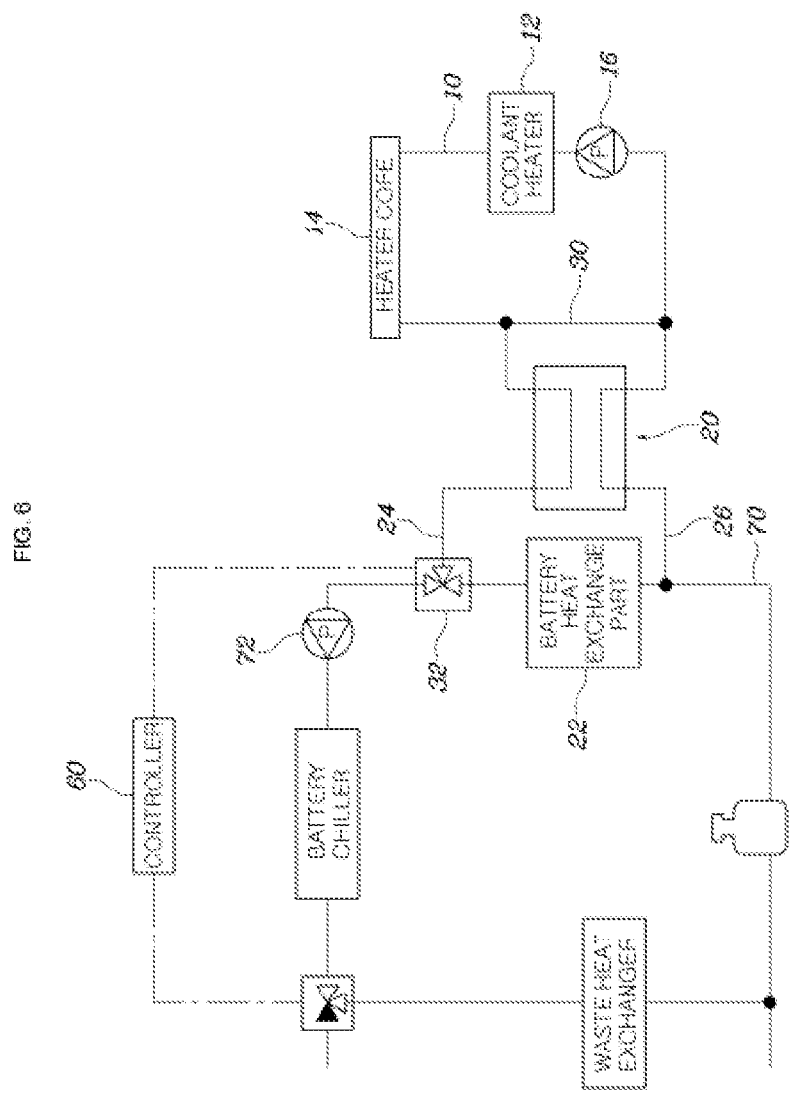
Figure 7:
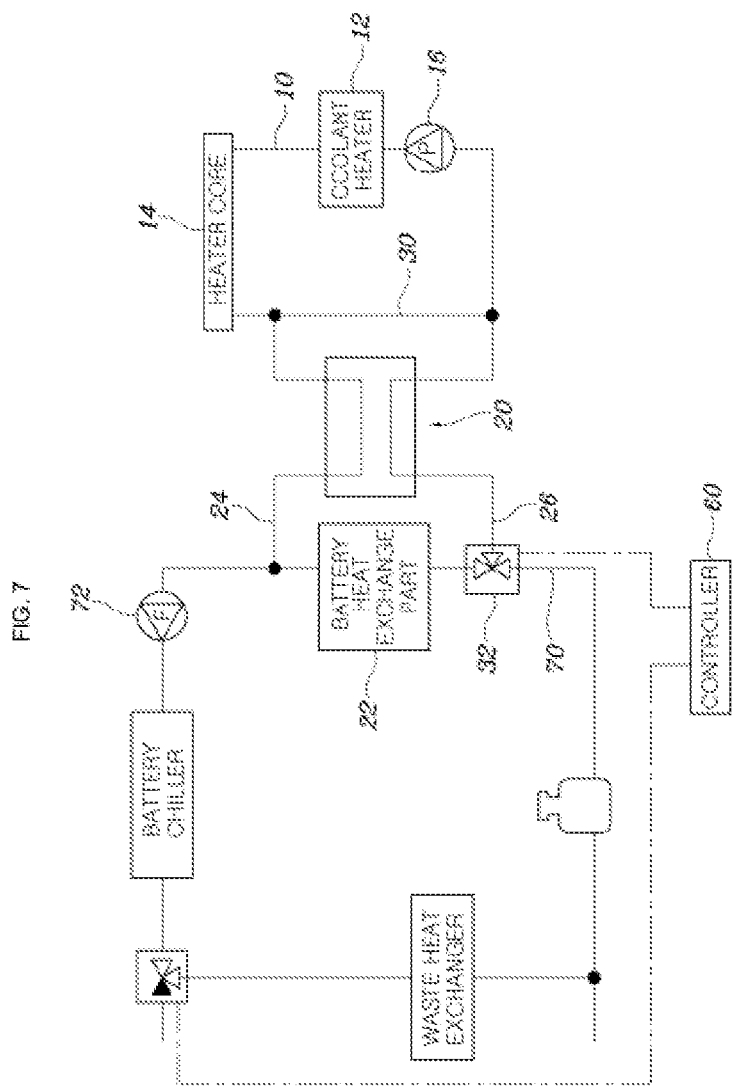

Alternatively, referring to FIGS. 6 and 7, the heating system of the vehicle of the present disclosure may further include a battery cooling line 70 provided to connect a first side and a second side of the battery heat exchange part 22 and equipped with a second pump 72 to circulate the coolant. The first valve 32 may be installed at a branch point where the first heat exchange flow passage 24 and the battery cooling line 70 branch off or the second heat exchange flow passage 26 and the battery cooling line 70 branch off.

The battery heat exchange part 22 may optionally be cooled using a coolant. Thus, the present disclosure may further include the battery cooling line 70 that connects the first side and the second side of the battery heat exchange part 22.

As shown in FIGS. 6 to 7, the first valve 32 may be arranged the battery cooling line 70.

FIG. 6 shows that the first valve 32 is installed at a branch point where the first heat exchange flow passage 24 and the battery cooling line 70 branch off, and FIG. 7 shows that the first valve 32 is installed at a branch point where the second heat exchange flow passage 26 and the battery cooling line 70 branch off.

In particular, the first valve 32 is installed at a branch point where the heat exchange flow passage branch from the battery cooling line 70, and may be a 3-way valve to allow or block the coolant flow.

In the first exemplary embodiment, the heating system of the vehicle may further include a controller 60 for controlling the opening of the first valve 32. In the case of an indoor and battery heating mode, the controller 60 controls the first valve 32 so that the coolant can circulate through the indoor heating line 10, the first heat exchange flow passage 24, the battery heat exchange part 22 and the second heat exchange flow passage 26.

That is, in the case that indoor heating and battery temperature-raising are required, as shown by the arrow in FIG. 1, the first valve 32 is controlled so that the coolant can circulate through the indoor heating line 10, the first heat exchange flow passage 24, the battery heat exchange part 22 and the second heat exchange flow passage 26, thereby performing heating and battery temperature-raising with the coolant heated by the coolant heater 12.

Also, in the indoor heating mode, the controller 60 may control the first valve 32 to cause the coolant to circulate through the indoor heating line 10 and the first bypass flow passage 30.

If the electric vehicle requires only the indoor heating, as shown by an arrow in FIG. 2, the first valve 32 is controlled so that the coolant can circulate through the indoor heating line 10 and the first bypass flow passage 30, thereby preventing the high voltage battery from being burned out by the high temperature coolant being transmitted to the high voltage battery.

Figure 8:
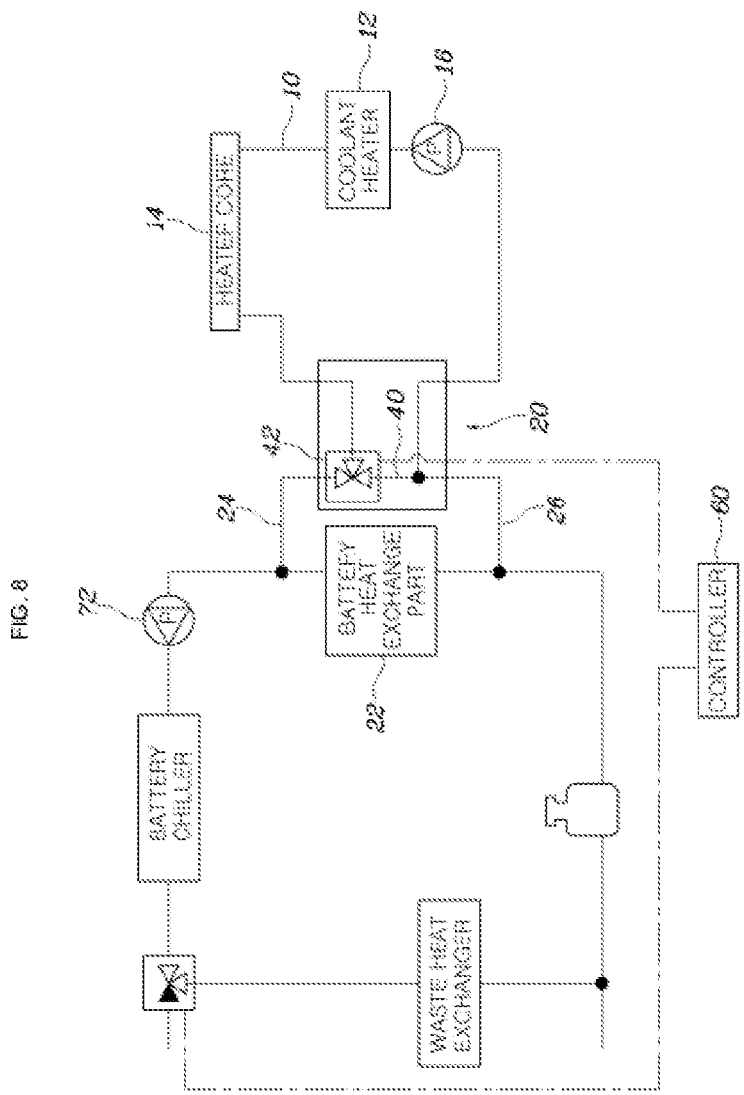
FIG. 8 is a drawing showing a heating system of a vehicle according to a second exemplary embodiment of the present disclosure.

On the other hand, FIG. 8 is a drawing showing a heating system of a vehicle according to a second exemplary embodiment of the present disclosure.

Referring to FIG. 8, in the heating system of the vehicle according to the second exemplary embodiment, some sections in the first heat exchange flow passage 24 and the second heat exchange flow passage 26 are thermally connected to each other to form a heat exchange section for heat exchange, and there is provided a second bypass flow passage 40 which connects the heat exchange section of the first heat exchange flow passage 24 and the heat exchange section of the second heat exchange flow passage 26 to each other without passing through the battery heat exchange part 22 and a second valve 42 installed on the second bypass flow passage 40 to adjust the coolant flow.

That is, the second exemplary embodiment removes the first bypass flow passage applied to the indoor heating line 10 and provides the second bypass flow passage 40 between the first and second heat exchange flow passages 24 and 26 where the heat exchange takes place, thereby securing a bypass flow passage length having a relatively short flow passage length.

In this case, it is preferable that the second valve 42 is provided as a 3-way valve when installed at a point where the second bypass flow passage 40 is branched from the heat exchange flow passage, and provided as a 2-way open and close valve when installed on the second bypass flow passage 40 not passing through the heat exchange flow passage.

The heating system of the vehicle according to the second exemplary embodiment may further include a controller 60 for controlling the opening of the second valve 42. In the case of indoor and battery heating mode, the controller 60 controls the second valve 42 so that the coolant can circulate through the indoor heating line 10, the first heat exchange flow passage 24, the battery heat exchange part 22 and the second heat exchange flow passage 26.

That is, in the case that indoor heating and battery temperature-raising are all required, the second valve 42 is controlled in order to block the coolant flow toward the second bypass flow passage 40 so that the coolant flows along the indoor heating line 10, the first heat exchange flow passage 24, the battery heat exchange part 22 and the second heat exchange flow passage 26, thereby achieving battery temperature-raising.

On the other hand, in the indoor heating mode, the controller 60 may control the second valve 42 to cause the coolant to circulate through the indoor heating line 10, the first heat exchange flow passage 24, the second bypass flow passage 40 and the second heat exchange flow passage 26.

That is, if the electric vehicle requires only the indoor heating, the second valve 42 is controlled to allow the coolant to flow toward the second bypass flow passage 40, thereby preventing the coolant from being unnecessary transmitted to the battery heat exchange part 22.

Figure 9:
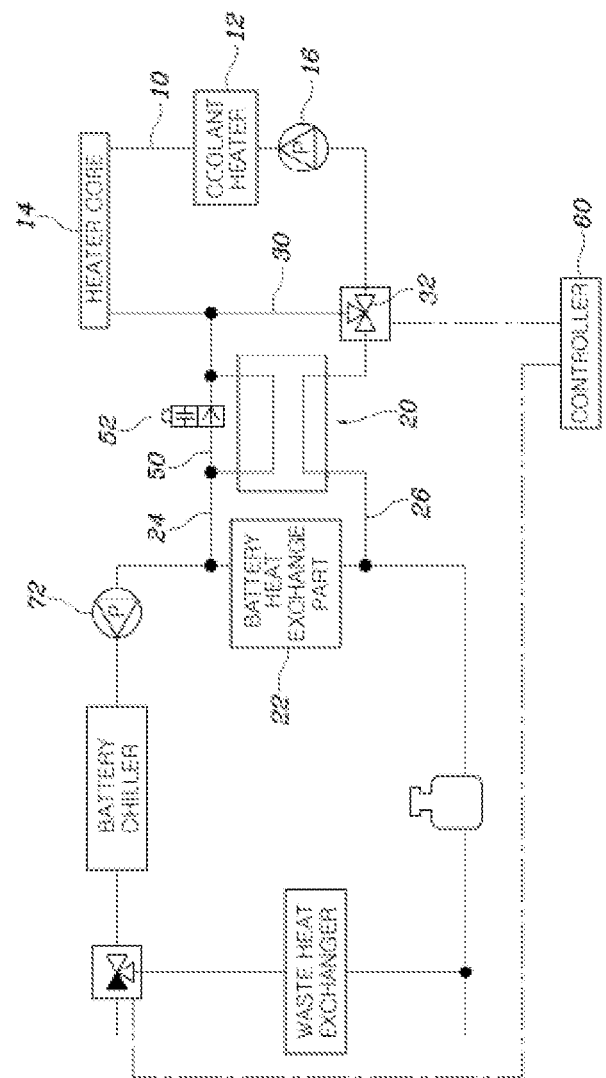
FIGS. 9 to 10 are drawings showing a heating system of a vehicle according to a third exemplary embodiment of the present disclosure.
Figure 10:
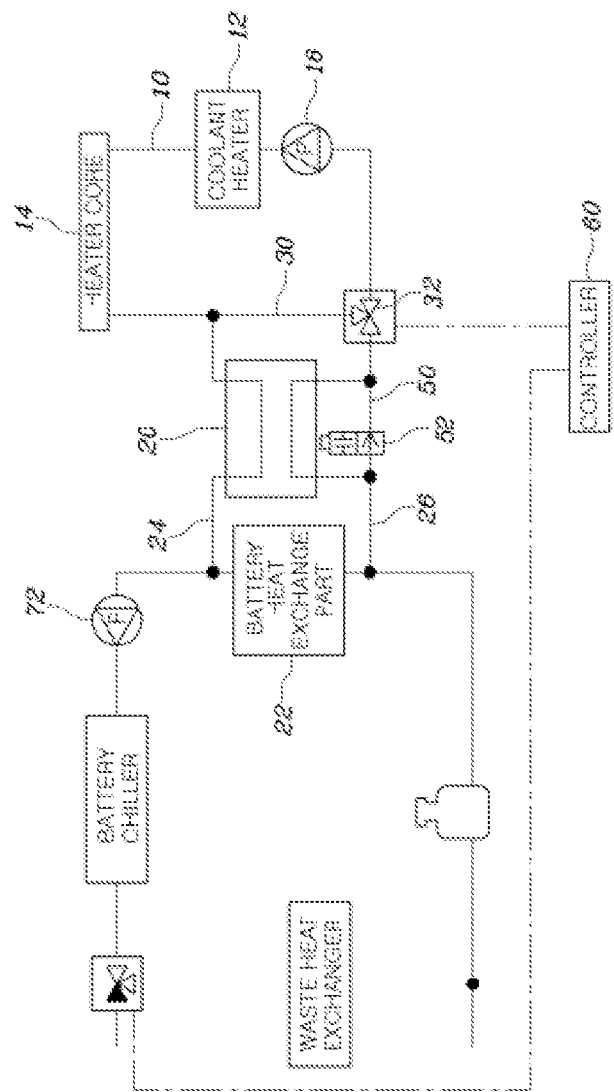

FIGS. 9 to 10 are drawings showing a heating system of a vehicle according to a third exemplary embodiment of the present disclosure.

Referring FIGS. 9 to 10, in a heating system of a vehicle according to the third exemplary embodiment, some sections in the first heat exchange flow passage 24 and the second heat exchange flow passage 26 are thermally connected to each other to form a heat exchange section for heat exchange, a third bypass flow passage 50 in parallel connected with the first heat exchange flow passage 24 or the second heat exchange flow passage 26 may be provided on the first heat exchange flow passage 24 or the second heat exchange flow passage 26 in order to bypass the heat exchange section.

Herein, a third valve 52 for adjusting the coolant flow may be provided at the third bypass flow passage 50 or the heat exchange flow passage in which the third bypass flow passage 50 is installed. It is preferable that the third valve 52 installed at the third bypass flow passage 50 or the heat exchange flow passage is a 2-way open and close valve.

That is, the third exemplary embodiment adds the third bypass flow passage 50 and the third valve 52 to the configuration of the first exemplary embodiment. FIGS. 9 to 10 all show the configuration that the third valve 52 is installed on the third bypass flow passage 50. However, there is a difference in that the third bypass flow passage 50 is installed at the first heat exchange flow passage 24 in FIG. 9 but at the second heat exchange flow passage 26 in FIG. 10.

The third bypass flow passage 50 may be arranged in order to increase the battery temperature-raising efficiency by transmitting the heated coolant by the coolant heater 12 to the battery heat exchange part 22 without exchanging heat between the first and second heat exchange flow passages 24 and 26.

Therefore, the third valve 52 may be operated so that the coolant can flow through the heat exchange flow passage when the coolant temperature is equal to or lower than a set temperature and the coolant can flow through the third bypass flow passage 50 when the coolant temperature is higher than the set temperature.

That is, the third valve 52 may be provided as a thermostat and can be opened or closed according to the coolant temperature without any additional control to control whether the coolant will flow through the third bypass flow passage 50.

In the third exemplary embodiment, the first valve 32 may be operated the same as the first exemplary embodiment but the third valve 52 may be operated depending on the coolant temperature. The third valve 52 is closed when the coolant temperature is below the set temperature so that the coolant does not pass through the third bypass flow passage 50, but opened when the coolant temperature is greater than the set temperature so that the coolant can be transmitted to the battery heat exchange part 22 through the third bypass flow passage 50 without exchanging heat and deteriorating thermal efficiency of the coolant.

Therefore, it is possible to rapidly temperature-raise the high voltage battery even under coolant temperature deteriorated conditions.

Figure 11:
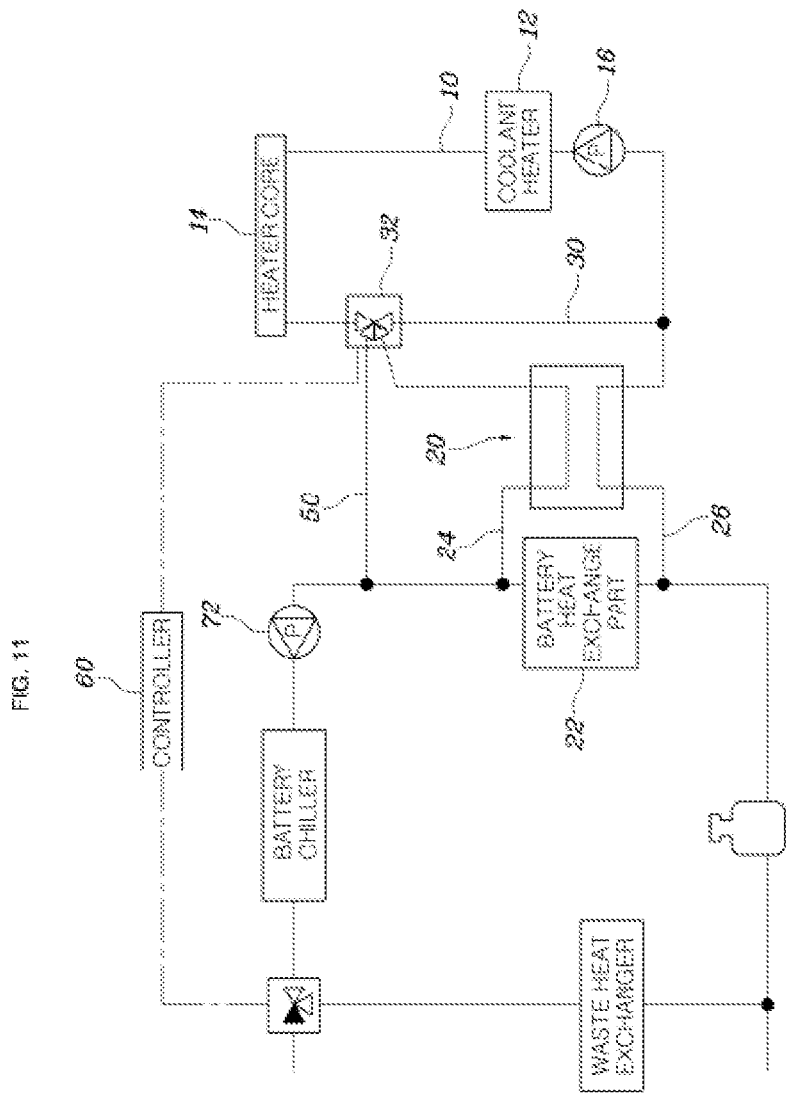
FIG. 11 is a drawing showing a heating system of a vehicle according to a fourth exemplary embodiment of the present disclosure.

FIG. 11 is a drawing showing a heating system of a vehicle according to a fourth exemplary embodiment of the present disclosure. Referring to FIG. 11, in the heating system of the vehicle according to the fourth exemplary embodiment, the first valve 32 is a 4-way valve that is installed a branch point where the first heat exchange flow passage 24 and end portions of the third bypass flow passage 50 and the first bypass flow passage 30 branch off in order to adjust the coolant flow.

That is, the fourth exemplary embodiment is similar to the third exemplary embodiment but proposed to reduce the number of application of the valve so that the manufacturing cost can be reduced.

A controller 60 for controlling the opening of the first valve 32 may be further included. In the case of indoor and battery heating mode and when the coolant temperature is higher than a set temperature, the controller 60 controls the first valve 32 so that the coolant can circulate through the indoor heating line 10, the first heat exchange flow passage 24, the battery heat exchange part 22 and the second heat exchange flow passage 26.

That is, when the coolant temperature is higher than the set temperature, the first valve 32 is provided so that the coolant discharged from the coolant heater 12 is cooled to be transmitted to the battery heat exchange part 22, thereby preventing the high voltage battery from being damaged.

Further, In the case of indoor and battery heating mode and when the coolant temperature is equal to or lower than the set temperature, the controller 60 controls the first valve 32 so that the coolant can circulate through the indoor heating line 10, the third bypass flow passage 50, the battery heat exchange part 22 and the second heat exchange flow passage 26.

Therefore, when the coolant temperature is equal to or lower than the set temperature, by transferring the coolant to the battery heat exchange part 22 without heat loss, it is possible to secure the battery temperature-raising efficiency to the maximum.

In case of indoor heating mode, the controller 60 controls the first valve 32 so that the coolant can circulate through the indoor heating line 10 and the first bypass flow passage 30.

Figure 12:
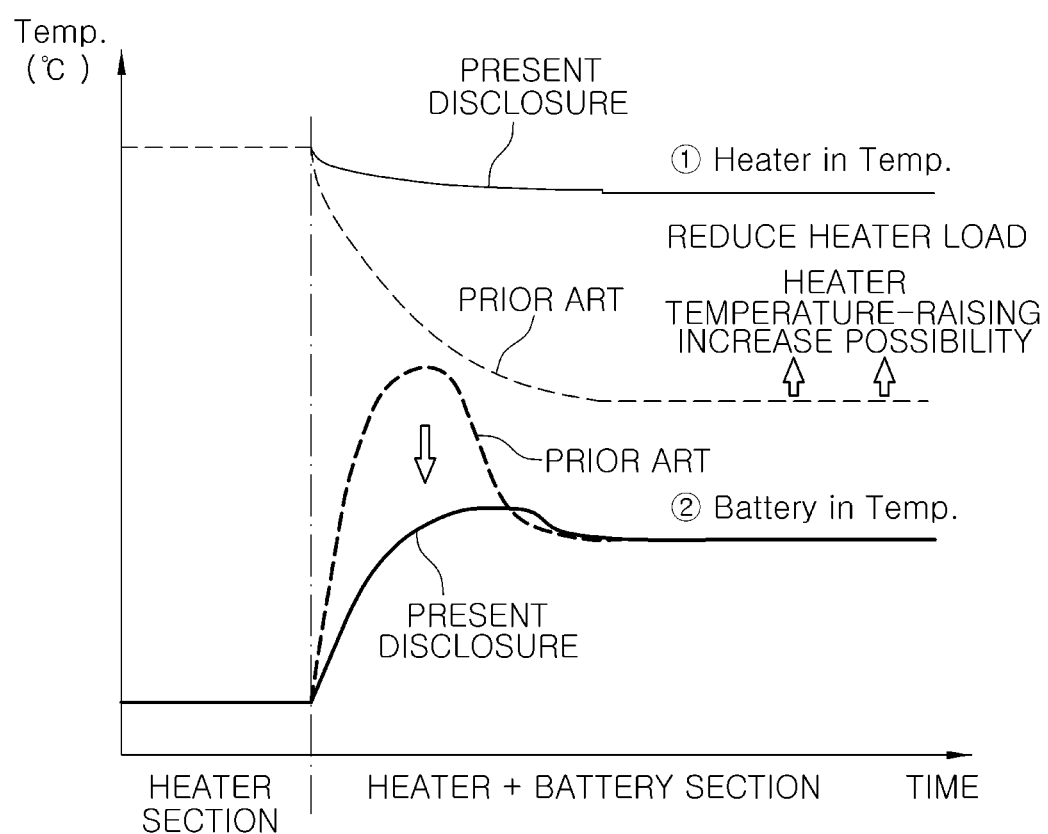
FIG. 12 is a graph showing changes in coolant temperature according to a heating system of a vehicle of the present disclosure.

FIG. 12 is a graph showing the change in the coolant temperature by a heating system of a vehicle of the present disclosure. As shown in FIG. 12, as the first and second heat exchange flow passages are heat-exchanged with each other, the temperature of the coolant supplied to the battery heat exchange part is reduced to prevent the high voltage battery from being burned, and the coolant temperature supplied to the coolant heater is increased to minimize the load of the coolant heater.

In addition, a battery chiller for heat-exchanging with a radiator and a refrigerant line may be provided the battery cooling line 70. Also, a waste heat exchanger for heat-exchanging with an electric components cooling line may be provided in the flow passage bypassing the radiator.

According to the heating system of the vehicle having the above-described structure, the coolant of the indoor heating line having its temperature increased by the heater passes through the battery so that the battery can be quickly raised in temperature.

Particularly, by exchanging heat between the coolant that flows into the battery and the coolant that is discharged from the battery through the heat exchanger, it is possible to prevent excessive high temperature coolant from flowing into the battery, thereby preventing damage to the battery and middle temperature coolant is supplied to the coolant heater so that it is able to reduce operation load of the coolant heater.

Although specific embodiments of the present disclosure has been described and illustrated, those skilled in the art will appreciate that various alternations and modifications are possible without departing from the technical spirit of the present disclosure as disclosed in the appended claims.

What is claimed is:

1. A heating system of a vehicle, comprising:
   an indoor heating line arranged to pass through a coolant heater and a heater core for indoor air conditioning and provided with a first pump so that coolant flows therein; and
   a battery heating line branched from a downstream point of the heater core and connected to an upstream point of the coolant heater after passing through a battery heat exchange part for raising a temperature of a battery;
   wherein the battery heating line further comprises:
      a first heat exchange flow passage that connects a downstream point of the heater core to a first side of the battery heat exchange part; and
      a second heat exchange flow passage that connects a second side of the battery heat exchange part and an upstream point of the coolant heater;
      wherein the first heat exchange flow passage and the second heat exchange flow passage are configured to mutually exchange heat;
   wherein the indoor heating line further comprises:
      a first bypass flow passage connecting the point where the first heat exchange flow passage is connected and the point where the second heat exchange flow passage is connected with each other without going through battery heat exchange part; and
      a first valve provided at the first bypass flow passage or the battery heating line for controlling the coolant flow, and
   wherein:
      some sections in the first heat exchange flow passage and the second heat exchange flow passage are thermally connected to each other to form a heat exchange section for heat exchange; and
      a third bypass flow passage in parallel connected with the first heat exchange flow passage or the second heat exchange flow passage is provided on the first heat exchange flow passage or the second heat exchange flow passage in order to bypass the heat exchange section.

2. The heating system of the vehicle of claim 1, wherein a third valve for adjusting the coolant flow is provided at the third bypass flow passage or the heat exchange flow passage in which the third bypass flow passage is installed.

3. The heating system of the vehicle of claim 2, wherein the third valve is operated so that the coolant can flow through the heat exchange flow passage when the coolant temperature is equal to or lower than the set temperature and the coolant can flow through the third bypass flow passage when the coolant temperature is higher than the set temperature.

4. The heating system of the vehicle of claim 1, further comprising:
   a controller for controlling the opening of the first valve; and
   in the case of indoor and battery heating mode and when the coolant temperature is higher than a set temperature, the controller controls the first valve so that the coolant can circulate through the indoor heating line, the first heat exchange flow passage, the battery heat exchange part and the second heat exchange flow passage.

* * * * *